United States Patent
Enguent

(10) Patent No.: US 6,329,808 B1
(45) Date of Patent: Dec. 11, 2001

(54) METHOD AND SYSTEM FOR THE DETECTION, BY INDUCTIVE COUPLING, OF A LOAD MODULATION SIGNAL

(75) Inventor: Jean-Pierre Enguent, Saint-Savournin (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/325,188

(22) Filed: Jun. 3, 1999

(30) Foreign Application Priority Data

Jun. 18, 1998 (FR) .................................................. 98 07678

(51) Int. Cl.[7] ............................ G01R 23/16; H04Q 07/00
(52) U.S. Cl. .................. 324/76.77; 324/650; 340/825.69
(58) Field of Search ................................ 324/650, 76.77; 340/825.69, 825.54, 825.31, 825.34

(56) References Cited

U.S. PATENT DOCUMENTS

| | | | |
|---|---|---|---|
| 4,602,253 | * 7/1986 | Kreft ................................ | 340/825.31 |
| 4,654,658 | * 3/1987 | Walton ............................ | 340/825.54 |
| 4,928,087 | 5/1990 | Kreft et al. ...................... | 340/825.71 |
| 5,343,079 | * 8/1994 | Mohan et al. ..................... | 307/105 |
| 5,717,722 | * 2/1998 | Mori .................................. | 375/326 |

FOREIGN PATENT DOCUMENTS 0 492 569 A2    12/1991    (EP) .
0 704 928 A2     9/1995    (EP) .

* cited by examiner

*Primary Examiner*—Vinh P. Nguyen
*Assistant Examiner*—Paresh Patel
(74) *Attorney, Agent, or Firm*—Lisa K. Jorgenson; Allen, Dyer, Doppelt, Milbrath & Gilchrist, P.A.

(57) ABSTRACT

A system for the detection of a load modulation signal by inductive coupling includes an antenna circuit having a coil, a circuit for applying an excitation signal having a predetermined frequency to the antenna circuit, and a current sensor for detecting a current signal in the coil. A phase comparator has a first input receiving the excitation signal, and has a second input receiving the current signal detected by the current sensor. The system also includes a circuit for extracting the load modulation signal from a phase signal provided by the phase comparator. The antenna circuit does not form a resonant circuit equal to or near the predetermined frequency of the excitation signal.

20 Claims, 3 Drawing Sheets

METHOD AND SYSTEM FOR THE DETECTION, BY INDUCTIVE COUPLING, OF A LOAD MODULATION SIGNAL

FIELD OF THE INVENTION

The present invention relates to electronics and, more particularly, to a system for detection of a load modulation signal by inductive coupling.

BACKGROUND OF THE INVENTION

The present invention relates to the reception of binary data sent by an integrated circuit with contactless operation. An integrated circuit with contactless operation may include a contactless chip card, an electronic label, and an electronic token, for example.

FIG. 1 is a standard circuit diagram of a detection system 10 and a load modulation system 20 cooperating with each other by inductive coupling. The system 10 includes an adjustable capacitor C1 and a coil L1 connected in series to form a resonant circuit. The capacitor C1 is connected by a resistor R1 to the output of a voltage/current amplifier 1. The voltage/current amplifier 1 receives at an input an AC voltage V0 having a frequency F0 generated by an oscillator 2. The voltage V0, converted into current by the amplifier 1, forms the excitation signal for the resonant circuit L1C1 having a natural frequency Fp1 set near the excitation frequency F0.

The load modulation system 20 includes an antenna coil L2 forming a resonant circuit with a capacitor C2 having a natural frequency Fp2 tuned to the frequency F0. The coil L2 is parallel-connected with a load modulation circuit, which in this case, is a resistor R2 series connected with a switch Tm. The switch Tm is controlled by a binary signal S1 having a carrier frequency F1 that is to be detected by the detection system 10. The load modulations applied to the coil L2 as a function of the signal S1 effect the coil L1 by inductive coupling. An AC voltage Vm having a frequency F0 and modulated in amplitude and in phase is observed at the terminals of the antenna circuit L1C1.

According to the method illustrated in FIG. 1, detection of the load modulation signal S1 is done by a phase comparator 3 receiving the voltages V0 and Vm. The comparator 3 delivers a voltage Vj proportional to the phase shift of these two signals. The voltage Vj is filtered by a bandpass filter 4 set to the carrier frequency F1 of the signal S1. The output of the bandpass filter 4 is made binary by a comparator 5 with a threshold Vref. At the output of the comparator 5 is the signal S1 having a frequency F1.

Detecting the signal S1 by phase comparison has the advantage of providing a good signal-to-noise ratio, but requires the natural frequency Fp1 of the antenna circuit L1C1 to be substantially mismatched with respect to the frequency F0. The phase j of the voltage Vm is not sensitive to the load modulations when the natural frequency Fp1 of the antenna circuit L1C1 is exactly equal to the excitation frequency F0.

FIG. 2 shows the phase curves j of the voltage Vm as a function of the natural frequency Fp1 for various resistance values of 0, v1, v2 for the load resistor R2. When Fp1 is equal to F0, the phase curves intersect at the same point and the sensitivity of the system 10 to the load modulations is zero. In setting the natural frequency Fp1 of the circuit L1C1 to a point F0' close to F0, high sensitivity is obtained. The phase j is a function of the load or load resistor R2.

The natural frequency Fp1 of the circuit L1C1 must be precisely adjusted by setting the capacitor C1, and must be regularly checked to correct any drifts of the capacitor caused by environmental conditions (temperature, humidity, etc.) and aging. This constraint makes the method undesirable for implementation in a system with limited maintenance. For example, a system of limited maintenance with respect to contactless chip cards is a contactless chip card reader located in a public place, or a station for automatic testing of contactless integrated circuits, etc. For this reason, it is generally preferred to use a second method which includes demodulation of the amplitude of the voltage Vm at the terminals of the resonant circuit L1C1 to extract the signal S1 therefrom. This second method, however, has the drawback of providing a poor signal-to-noise ratio.

SUMMARY OF THE INVENTION

It is an object of the present invention to provide a system and a method for the detection of a load modulation by phase comparison that does not have the drawbacks of the above described method.

According to the present invention, the method for detection by inductive coupling of a load modulation signal received in an antenna circuit is provided by exciting a detection coil by a signal with a predetermined frequency. The method further includes the step of comparing the phase of the excitation signal with the phase of a signal received by the antenna circuit. The antenna circuit does not form a resonant circuit near the frequency of the excitation signal, and the phase of the excitation signal is compared with the phase of the current flowing through the detection coil.

According to one embodiment applied to the detection of a load modulation signal, the system includes a detection coil and an integrated circuit coil respectively formed by primary and secondary windings of a transformer. The load modulation signal is sent by an integrated circuit comprising a modulation circuit modulating the load of the coil. The secondary winding is connected to contacts of the integrated circuit.

The present invention also relates to a system for detection by inductive coupling of a load modulation signal. The system comprises an antenna circuit including a coil, a circuit for applying to the antenna circuit an excitation signal having a predetermined frequency, a phase comparator receiving at a first input the excitation signal and receiving at a second input a signal picked up in the antenna circuit, and a circuit to extract the load modulation signal from a phase signal delivered by the phase comparator. The antenna circuit does not form a resonant circuit near the frequency of the excitation signal, and the phase comparator receives at the second input a signal delivered by a detection circuit for detecting current flowing through the coil.

According to one embodiment, the detection circuit for detecting the current comprises a transformer having a primary winding series-connected with the antenna coil. The secondary winding of the transformer is parallel-connected with a resistor to convert the current flowing through the primary winding into voltage.

According to another embodiment, the circuit for extracting the load modulation signal includes a bandpass filter centered on a carrier frequency of the load modulation signal.

The present invention also relates to a station for the reception of data by inductive coupling and load modulation. The station includes a detection system according to the present invention for the detection of a load modulation signal, and a decoder circuit to extract data elements from the load modulation signal.

The present invention also relates to a station for the testing of an integrated circuit with contactless operation using an antenna coil. The station includes a detection system according to the present invention for the detection of a load modulation signal emitted by the integrated circuit.

According to one embodiment, the coil of the detection system and the coil of the integrated circuit are primary and secondary windings of a transformer.

According to another embodiment, the station includes a decoder circuit to extract data elements from the detected load modulation signal.

BRIEF DESCRIPTION OF THE DRAWINGS

These objects, characteristics and advantages of the present invention shall be explained in greater detail in the following description of an exemplary embodiment of a system of detection according to the present invention, with reference to the appended drawings, of which.

DETAILED DESCRIPTION OF THE PREFERRED EMBODIMENTS

Figure 3:
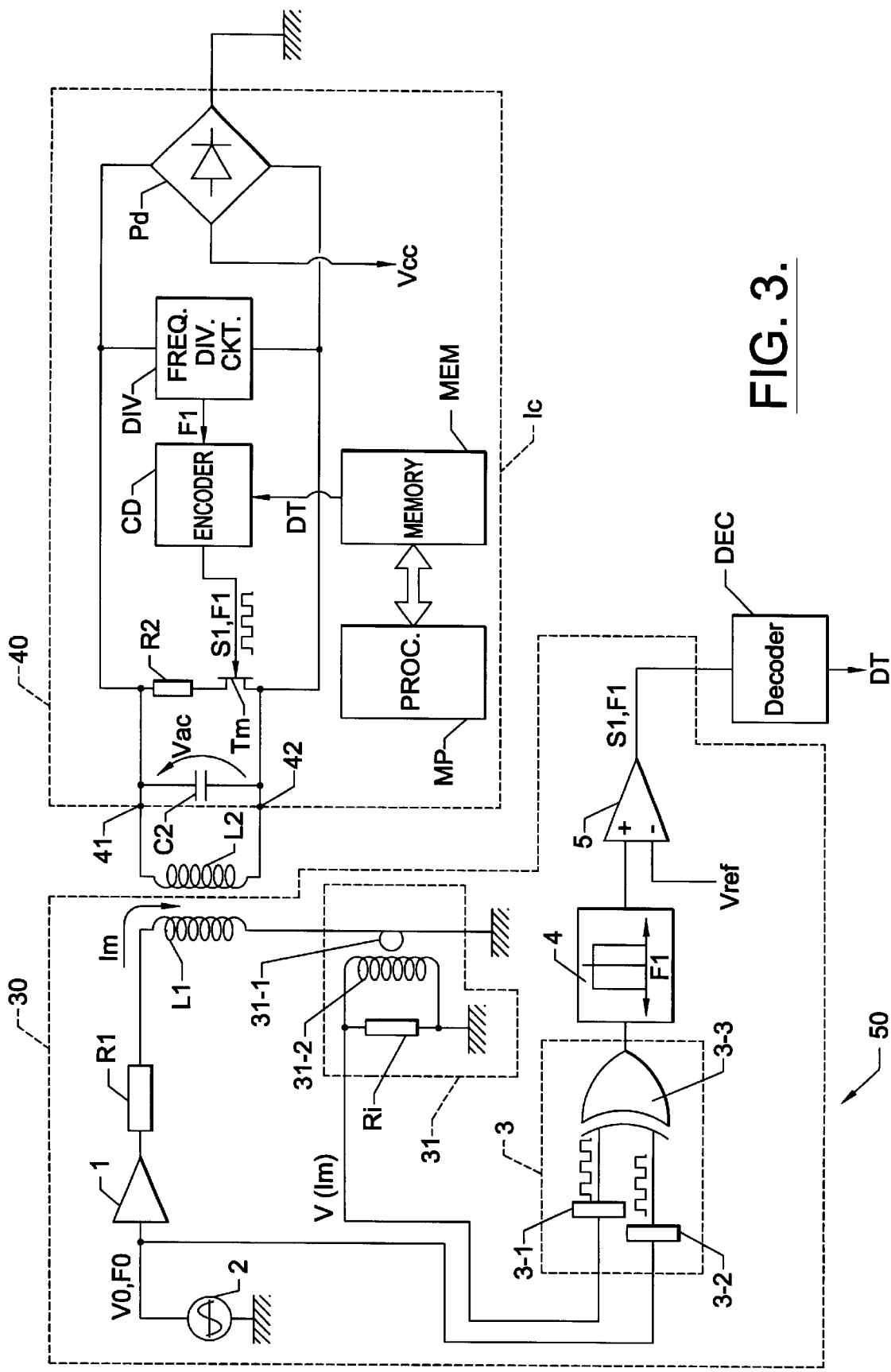
FIG. 3 is a circuit diagram of a detection system receiving data elements transmitted by an integrated circuit with contactless operation, according to the present invention.

FIG. 3 illustrates a system 30 for detection of a load modulation signal according to the present invention. The system 30 includes most of the elements of the detection system 10 illustrated in FIG. 1 except for the capacitor C1. The reference numbers of these elements previously described have been kept the same.

Figure 1:
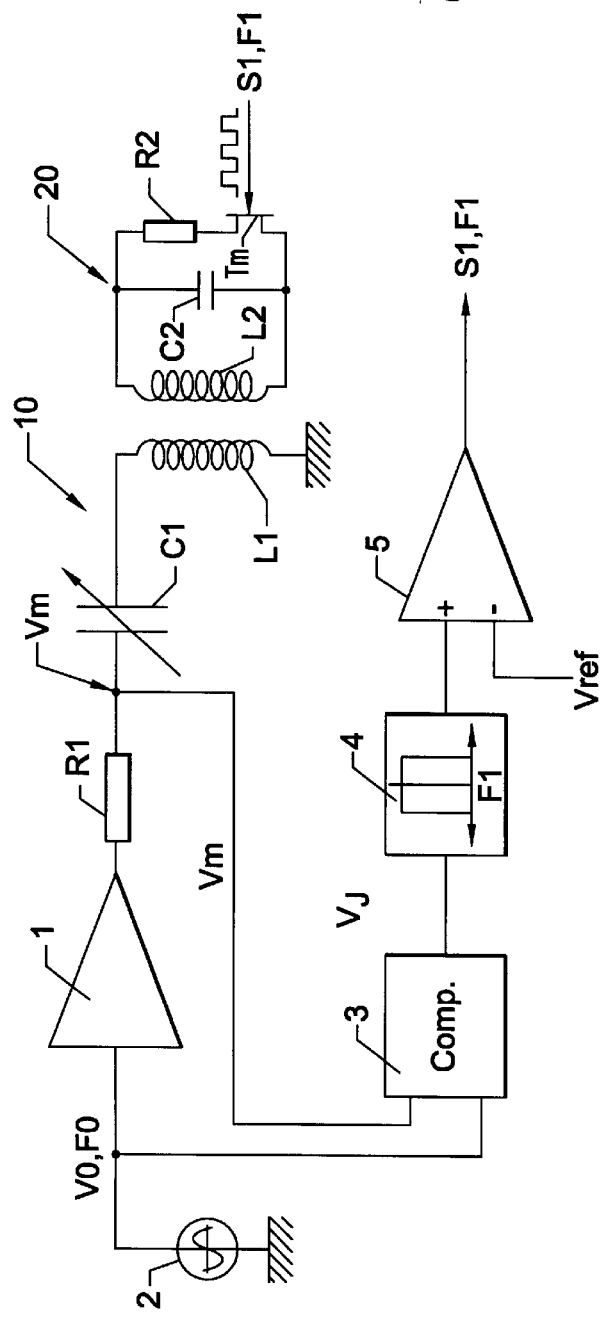
FIG. 1 is a circuit diagram of a standard detection system for detecting a load modulation signal, according to the prior art.
Figure 2:
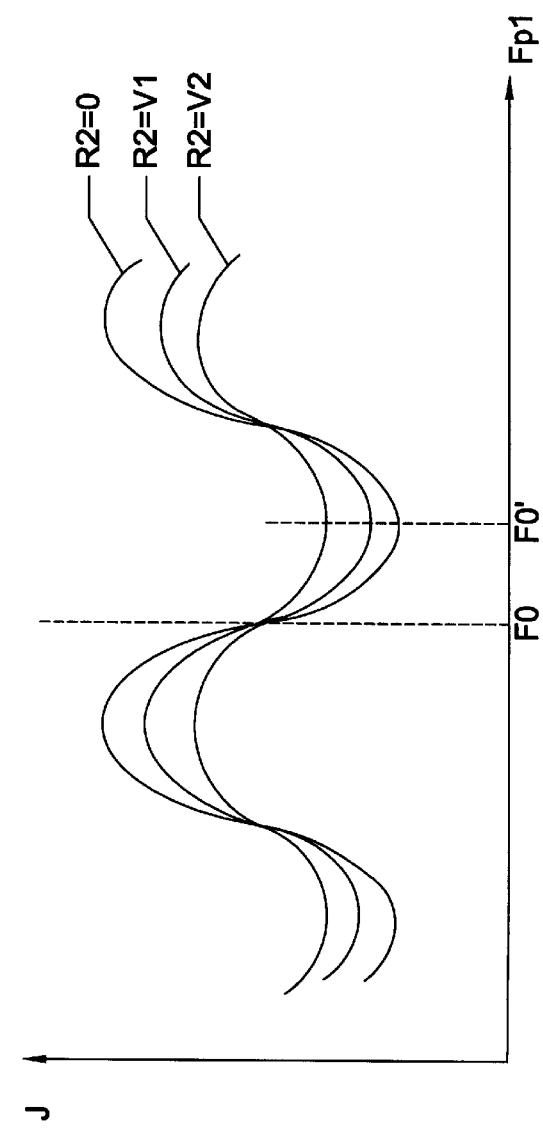
FIG. 2 is a graph representation for various load values of the phase curves of an antenna signal as a function of the resonant frequency of the antenna circuit of the detection system illustrated in FIG. 1.

According to the present invention, the system 30 differs from that of FIG. 1 in that the antenna circuit, which includes only the coil L1, does not form a resonant circuit in the vicinity of the frequency F0 of the excitation signal V0. Furthermore, the phase comparator 3 providing the phase signal Vj receives at an input the excitation signal V0, and a signal V(Im) which is the replica of the current Im flowing through the coil L1. The signal V(Im) is delivered by a current sensor 31, which in one embodiment, is formed by a transformer having a primary winding 31-1 and a secondary winding 31-2. The primary winding 31-1 has only one turn and is series-connected with the coil L1. The secondary winding 31-2 is parallel-connected with a current/voltage resistor Ri.

The phase comparator 3 is formed by two limiter circuits 3-1, 3-2 whose outputs are connected to the inputs of an XOR logic gate 3-3. The phase signal Vj is provided by the XOR logic gate 3-3. The phase comparator 3 is connected to a bandpass filter 4 followed by a comparator 5 having a threshold Vref.

The advantage of the system 30 according to the present invention is that it does not require the antenna circuit to be set while still providing high sensitivity of the phase signal Vj to the load modulations. This result is obtained by the combination of the two characteristics described above. That is, providing an antenna circuit that is not resonant at the frequency F0 or at frequencies near the frequency F0, and performing a phase comparison based on the detection of the antenna current Im.

FIG. 3 furthermore illustrates an application of the system 30 to the reception of data elements sent by an integrated circuit IC 40 with contactless operation. The circuit IC 40 includes an the antenna coil L2, the capacitor C2, the resistor R2 and the load modulation switch Tm as described with reference to FIG. 1. At the terminals of the antenna coil L2 is an induced AC voltage Vac having a frequency F0, which is a replica of the voltage Vm present at the terminals of the antenna coil L1.

The integrated circuit IC furthermore includes an encoder circuit CD, a data memory MEM, a microprocessor MP, a frequency divider circuit DIV and a diode bridge Pd arranged to rectify the voltage Vac. The frequency divider circuit DIV supplies the encoder circuit CD with a clock signal extracted from the voltage Vac, and the frequency F1 is a sub-multiple of the frequency F0. The encoder circuit CD is, for example, a binary phase-shift keying (BPSK) encoder receiving digital data elements DT from the memory MEM and provides the load modulation signal S1 having a carrier frequency F1. Finally, the rectifier Pd delivers a DC voltage Vcc providing the electrical supply of the integrated circuit IC. Thus, the data elements DT to be sent are inserted in encoded form into the load modulation signal S1. The output of the system 30 is applied to the input of a decoder DEC, which demodulates the signal S1 and extracts the digital data DT therefrom.

The integrated circuit IC may be arranged in a portable carrier such as a plastic card, a token, a label etc. With the decoder DEC, the detection system 30 forms a data reception station 50, such as a contactless chip-card reader. The station 50 may include a circuit for sending data elements to the integrated circuit IC, for example, by the amplitude modulation of the excitation signal V0. Such circuits are well known to those skilled in the art, and shall not be described herein.

The detection system according to the present invention is designed to operate with strong inductive coupling between the coils L1 and L2. The present invention is thus intended for applications requiring a short distance of communication. For example, contactless card readers are provided with a slot for the insertion and guidance of cards. Accordingly, readers of this kind maintain a short communication distance. The distance is in the range of about a few millimeters.

The present invention is also applicable to the making of a test station for the testing of a contactless integrated circuit before it is mounted on a support, and connected to an antenna coil. According to one embodiment, the transformer has a primary winding forming the coil L1 of the detection system 30 used to simulate the antenna coil L2 of the integrated circuit.

Figure 4:
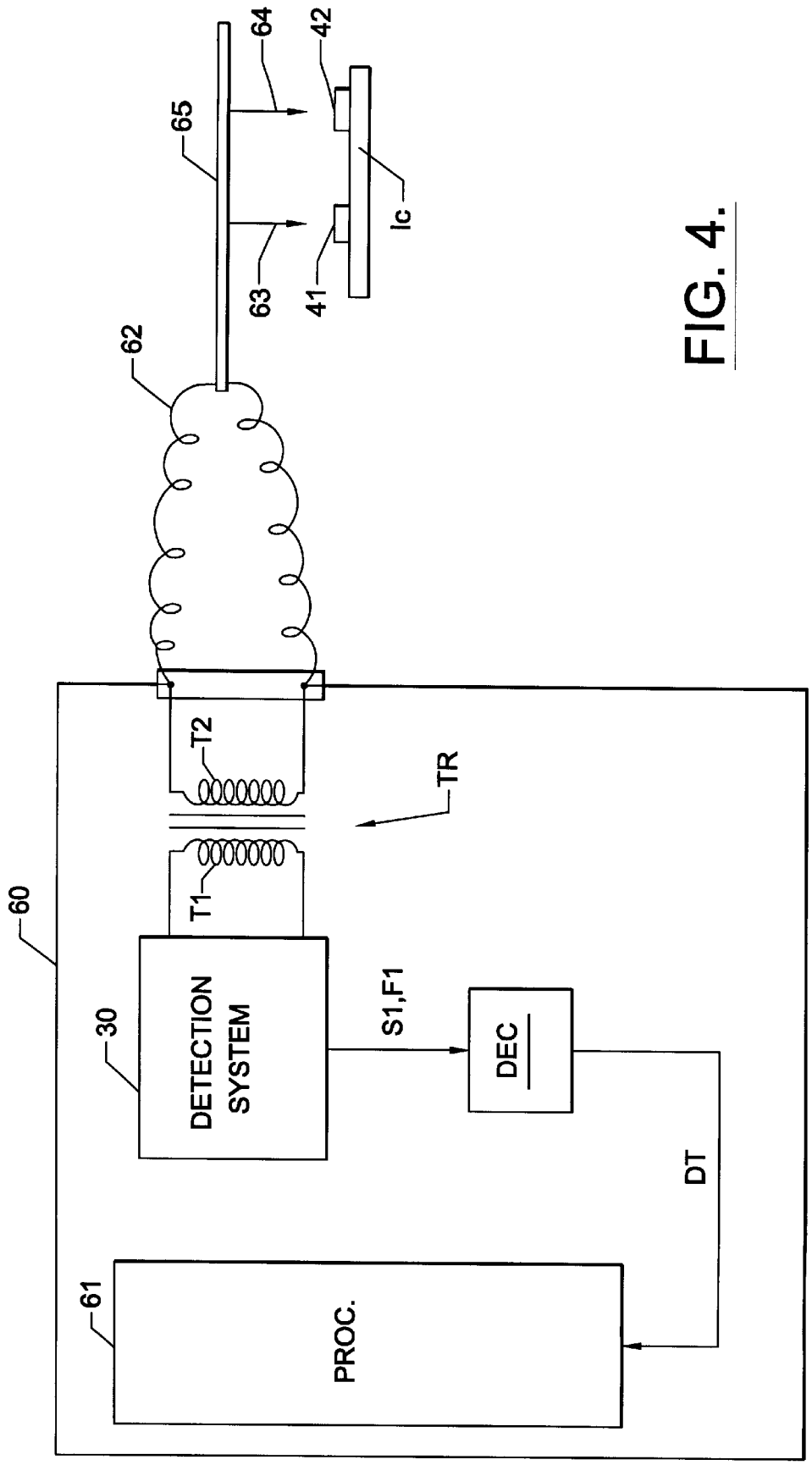
FIG. 4 is a block diagram illustrating application of the detection system of FIG. 3 for testing an integrated circuit with contactless operation before connection to an antenna coil.

FIG. 4 is a schematic view of a test station 60. The station 60 includes a transformer TR, the detection system 30 according to the invention, the decoder DEC, and a central processing unit 61 receiving the data elements DT delivered by the circuit DEC. The primary winding T1 of the transformer TR forms the coil of the detection system 30. The secondary winding T2 is connected by electrical wires 62 to metal tips 63, 64 connected to a printed circuit board 65. The tips 63, 64 are applied to contacts 41, 42 of the integrated circuit IC. These tips are designed to be soldered to an antenna coil. Thus, the winding T2 forms a simulated antenna coil that can be used to obtain the functioning of the circuit IC and test this circuit before it is mounted onto a portable carrier and connected to an antenna coil.

This feature of the invention ensures strong inductive coupling between the windings T1 and T2 and enables the making of a test station with low maintenance. The test station does not require adjustment of the antenna circuit, which can be positioned in an integrated circuit production line. The integrated circuits may be tested while they are still in batches on a mother wafer made of silicon and before the wafer is subdivided.

It will be known by those skilled in the art that the present invention is open to various applications and embodiments. In particular, referring again to FIG. 3, the current sensor 31 can be made in various ways, such as with a precision resistor, a Hall effect sensor, etc.

What is claimed is:

1. A data reception station comprising:
   a detection system for a load modulation signal comprising
      an antenna circuit comprising a coil receiving the load modulation signal by inductive coupling,
   an excitation circuit connected to said coil for applying an excitation signal having a predetermined frequency, with said coil not forming a resonant circuit equal to or adjacent the predetermined frequency,
      a current sensor connected to said coil detecting current signal flowing therein,
      a phase comparator having a first input receiving the excitation signal, and a second input connected to said current sensor receiving the current signal detected by said coil,
      a filter connected to said phase comparator for filtering the load modulation signal from a phase signal provided by said phase comparator, and
   a decoder connected to said filter for extracting data elements from the load modulation signal.

2. A data reception station according to claim 1, wherein said current sensor comprises a transformer having a primary winding series-connected with said coil.

3. A data reception station according to claim 2, further comprising a resistor; and wherein a secondary winding of said transformer is parallel-connected with said resistor.

4. A data reception station according to claim 1, wherein said filter comprises a bandpass filter centered on a carrier frequency of the load modulation signal.

5. A test station for testing an integrated circuit with contactless operation comprising:
   an antenna circuit receiving a load modulation signal from the integrated circuit by inductive coupling;
   a detection system connected to said antenna circuit comprising
      an excitation circuit connected to said antenna circuit for applying an excitation signal having a predetermined frequency, with said antenna circuit not forming a resonant circuit with the predetermined frequency,
      a current sensor connected to said antenna circuit detecting a current signal therein,
      a phase comparator having a first input receiving the excitation signal, and a second input connected to said current sensor receiving the current signal, and
      a filter connected to said phase comparator for extracting the load modulation signal from a phase signal provided by said phase comparator.

6. A test station according to claim 5, wherein said antenna circuit comprises a transformer having a primary winding forming an antenna for said detection system, and a secondary winding forming an antenna for the integrated circuit.

7. A test station according to claim 5, further comprising a decoder circuit connected to said filter for extracting data elements from the load modulation signal.

8. A detection system for a load modulation signal comprising:
   an antenna circuit comprising a coil receiving the load modulation signal by inductive coupling;
   an excitation circuit connected to said coil for applying an excitation signal having a predetermined frequency, said coil not forming a resonant circuit equal to or adjacent the predetermined frequency;
   a current sensor connected to said coil detecting a current signal therein;
   a phase comparator having a first input receiving the excitation signal, and a second input connected to said current sensor receiving the current signal; and
   an extraction circuit connected to said phase comparator for extracting the load modulation signal from a phase signal provided by said phase comparator.

9. A detection system according to claim 8, wherein said current sensor comprises a transformer having a primary winding series-connected with said coil.

10. A detection system according to claim 9, further comprising a resistor; and wherein a secondary winding of said transformer is parallel-connected with said resistor.

11. A detection system according to claim 8, wherein said extraction circuit comprises a bandpass filter centered on a carrier frequency of the load modulation signal.

12. A detection system comprising:
   an antenna circuit receiving a modulated signal by inductive coupling;
   an excitation circuit connected to said antenna circuit for applying an excitation signal having a predetermined frequency, said antenna circuit not forming a resonant circuit equal to or adjacent the predetermined frequency;
   a current sensor connected to said antenna circuit detecting a current signal therein;
   a phase comparator having a first input receiving the excitation signal, and a second input connected to said current sensor receiving the current signal; and
   a filter connected to said phase comparator for extracting the modulated signal from a phase signal provided by said phase comparator.

13. A detection system according to claim 12, wherein said current sensor comprises a transformer having a primary winding series-connected with said antenna circuit.

14. A detection system according to claim 13, further comprising a resistor; and wherein a secondary winding of said transformer is parallel-connected with said resistor.

15. A detection system according to claim 12, wherein said filter comprises a bandpass filter having a frequency range centered on a carrier frequency of the modulated signal.

16. A method for detecting a load modulation signal received in an antenna circuit by inductive coupling, the method comprising the steps of:
   exciting the antenna circuit with an excitation signal having a predetermined frequency, the antenna circuit not forming a resonant circuit with the predetermined frequency;

detecting a current signal in the antenna circuit with a current sensor;

comparing a phase of the excitation signal with a phase of the current signal to provide a phase signal; and filtering the load modulation signal from the phase signal.

17. A method according to claim 16, wherein the current sensor comprises a transformer having a primary winding series-connected with the antenna circuit.

18. A method according to claim 17, wherein the current sensor comprises a resistor; and wherein a secondary winding of the transformer is parallel-connected with the resistor.

19. A method according to claim 16, wherein the step of filtering comprises using a bandpass filter centered on a carrier frequency of the load modulation signal.

20. A method according to claim 16, wherein the antenna circuit comprises a transformer having a secondary winding connected to an integrated circuit providing the load modulation signal, and a primary winding receiving the load modulation signal by inductive coupling.

* * * * *